United States Patent
Kliman et al.

[11] Patent Number: 6,159,305
[45] Date of Patent: Dec. 12, 2000

[54] HIGH SPEED INDUCTION MOTOR ROTOR AND METHOD OF FABRICATION

[75] Inventors: Gerald Burt Kliman, Niskayuna; Raymond Alan White; Wen Liang Soong, both of Schenectady; Roger Neal Johnson, Hagaman, all of N.Y.; Joseph Eugene Miller, Fort Wayne, Ind.; John Raymond Hughes, Scotia, N.Y.

[73] Assignee: General Electric Company, Schenectady, N.Y.

[21] Appl. No.: 09/114,770

[22] Filed: Jul. 14, 1998

[51] Int. Cl.[7] .......................................................... H01F 1/04
[52] U.S. Cl. ........................................... 148/112; 148/111
[58] Field of Search ...................... 148/110–113

[56] References Cited

U.S. PATENT DOCUMENTS

| | | |
|---|---|---|
| 4,496,399 | 1/1985 | Haselkorn . |
| 4,601,766 | 7/1986 | Rastogi et al. ............................ 148/111 |
| 4,772,341 | 9/1988 | Rastogi et al. ............................ 148/307 |

OTHER PUBLICATIONS

Binary Alloy Phase Diagrams, Edited by thaddeus B. Massaiski, vol. 1, p. 19, American Society for Metals (Metals Park, OH, Oct. 1986.

GlidCop Dispersion Strengthened Copper, Published by OMG Americas on an OMG Internet site, updated Apr. 1998.

Permendur 49 published by Goodfellow corp. on a Goodfellow Corporation Internet site referring to catalog dated May 1998, Oct. 1986.

"Experimental Study of High Speed Induction Motor Varying Rotor Core Construction" By M. Ikeda, et al, IEEE Trans On Energy Conversion, vol. 5., No. 1, Mar. 1998, pp. 98–103.

"Brazing Filler Metals" Brazing Handbook, 4th Edition, American Welding Society, 1991, pp. 46 and 57.

"Magnetically Soft Materials", Metals Handbook, 8th Edition, vol. 1, "Properties And Selection Of Metals", American Society Of Metals, pp. 787–788, 1961.

*Primary Examiner*—John Sheehan
*Attorney, Agent, or Firm*—Ann M. Agosti; Jill Breedlove

[57] ABSTRACT

An induction motor rotor comprises a rotor shaft (12), a rotor core (14), which may be solid (114) or may include a plurality of rotor laminations (13), having rotor bar slots (15), a plurality of rotor bars (16) extending through the rotor bar slots, and two rotor end rings (18) brazed to the rotor bars and extending to the rotor shaft, the rotor bars and rotor end rings pre-stressing the rotor core.

3 Claims, 6 Drawing Sheets

HIGH SPEED INDUCTION MOTOR ROTOR AND METHOD OF FABRICATION

This invention was made with U.S. Government support under contract number 70NANB5H1119 awarded by the National Institute of Standards and Technology. The U.S. Government has certain rights in the invention.

BACKGROUND OF THE INVENTION

The present invention relates generally to induction motor rotors and to methods for their fabrication.

High power motor applications are generally in the ten kilowatt to one hundred kilowatt range. High speed motor applications are generally in the ten thousand rpm to seventy-five thousand rpm range. Many permanent magnet rotors that have high efficiency in the range of about ninety percent to about ninety-five percent at high power and speed specifications are very expensive to fabricate due to the expense of high energy permanent magnets and the retainers which keep the magnets attached to the rotor. These motors are typically in the fifteen dollar to two hundred dollar per 746 Watts (1 horsepower) range. Many solid rotor induction machines that economically meet high power and speed specifications have very low efficiency due to rotor stray load losses and chopping losses. The use of a laminated core instead of a solid core reduces these losses to a large extent but does not provide the efficiency of permanent magnet motors.

SUMMARY OF THE INVENTION

It is therefore seen to be desirable to provide a high speed motor having high efficiency at a reasonable cost. It would additionally be desirable to provide a self-supporting high speed motor rotor without a mechanical retainer in order to achieve low losses at a low cost.

Briefly, according to one embodiment of the present invention, an induction motor rotor comprises a rotor core, which may be solid or may include a plurality of rotor laminations, having rotor bar slots, a plurality of rotor bars positioned in the rotor bar slots, and two rotor end rings brazed to the rotor bars, the rotor bars and rotor end rings pre-stressing the rotor core.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
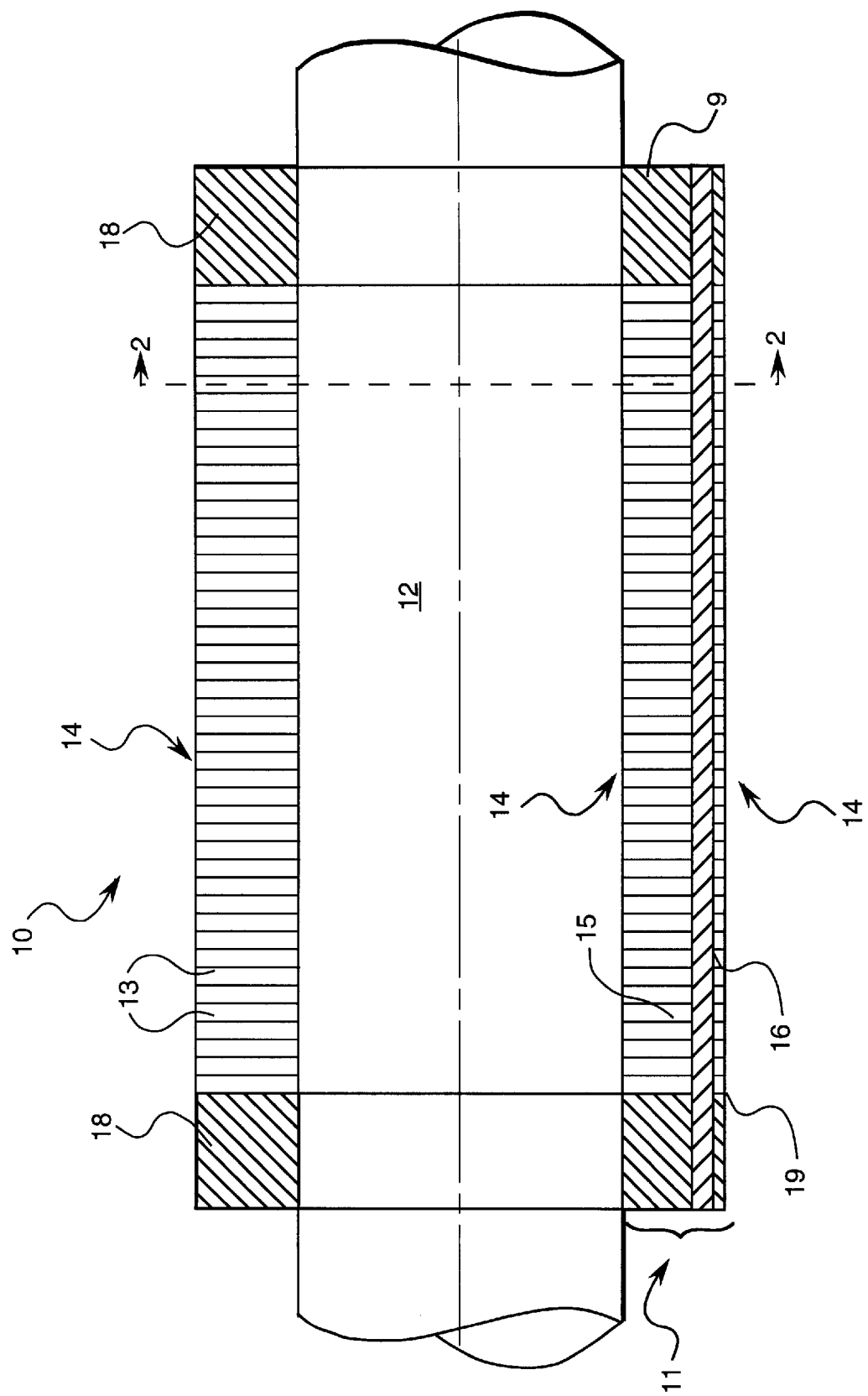
FIG. 1 is a sectional side view of a rotor of the present invention.
Figure 2:
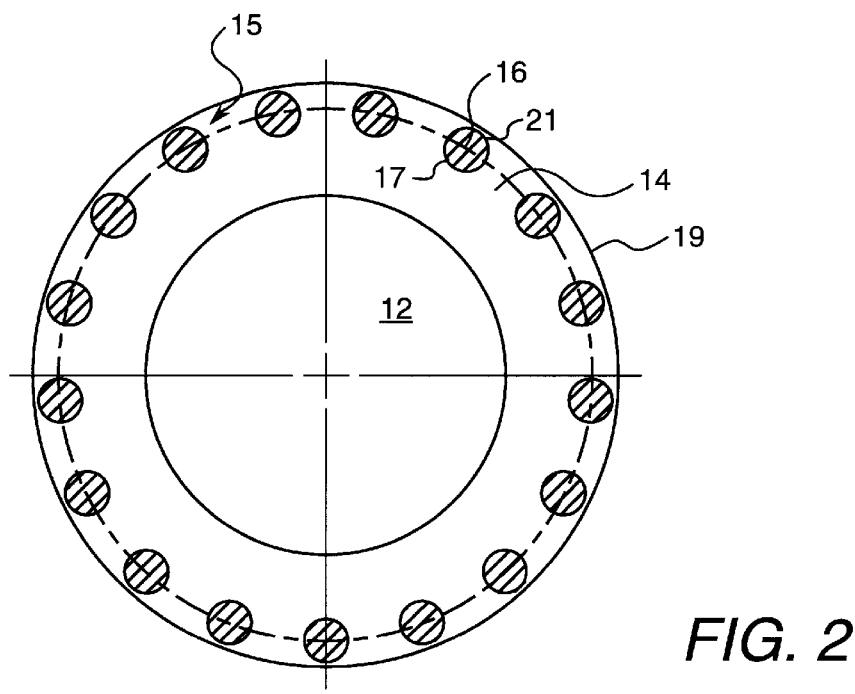
FIG. 2 is a sectional view along line 2—2 of FIG. 1.

In a preferred embodiment of the present invention, represented by the sectional views of FIGS. 1 and 2, an induction motor rotor 10 includes a rotor shaft 12, a rotor core 14 including a plurality of rotor laminations 13 having rotor bar slots 15, a plurality of rotor bars 16 extending through the rotor bar slots, and two rotor end rings 18 brazed to the rotor bars and preferably extending to the rotor shaft. The rotor bars and rotor end rings pre-stress the rotor laminations to prevent loosening of the rotor laminations during rotation of the rotor. The rotor bars, rotor core, and rotor end rings are collectively referred to as assembly 11.

Rotor laminations 13 are designed to be self-supporting and to support the rotor bars 16. Closed slots are useful for providing rotor core strength, for holding the rotor bars against centrifugal forces, and for presenting a smooth rotor core surface 19 to minimize windage loss.

An alloy such as PERMENDUR™ magnetic alloy (PRETENDER is a trademark of Goodfellow Corporation in Berwyn, Pa. for a magnetic alloy comprising cobalt 49, iron 49, and vanadium 2) is a strong material which can be used for the rotor laminations. To reduce the cost of the rotor, less expensive materials may be desirable. Silicon steel is less expensive than PERMENDUR magnetic alloy, but fully-processed silicon steel (i.e., including final anneal) typically does not have sufficiently high yield and tensile strengths to accommodate the maximum stress concentrations occurring at the outer and inner portions 21 and 17 of the rotor slots during high speed operation.

The amount of silicon in the silicon steel ranges from about 2.35% to about 4.5%. A preferred range of silicon is from about 3% to about 3.5%. In one embodiment, the silicon steel comprises about 3.25% silicon.

When silicon steel is unprocessed (i.e., in a cold rolled condition) its stress capability is extremely high but its ductility is very low (the material is brittle). To permit punching, provide high permeability, and provide low losses in rolled silicon steel, the material is usually annealed at about 816° C. (1500° F.) for about 1 minute. These annealing conditions significantly reduce the silicon steel's strength. In the present invention, the material is annealed at lower temperatures than conventional anneals.

The sheet of silicon steel can be patterned in any appropriate manner. Two types of patterning, for example, are mechanical punching and laser cutting. If the silicon steel will be patterned by mechanical punching, prior to punching, it is useful to heat the silicon steel for about two minutes at about 704° C. (1300° F.), for example. After patterning, the laminations are further annealed.

Figure 3:
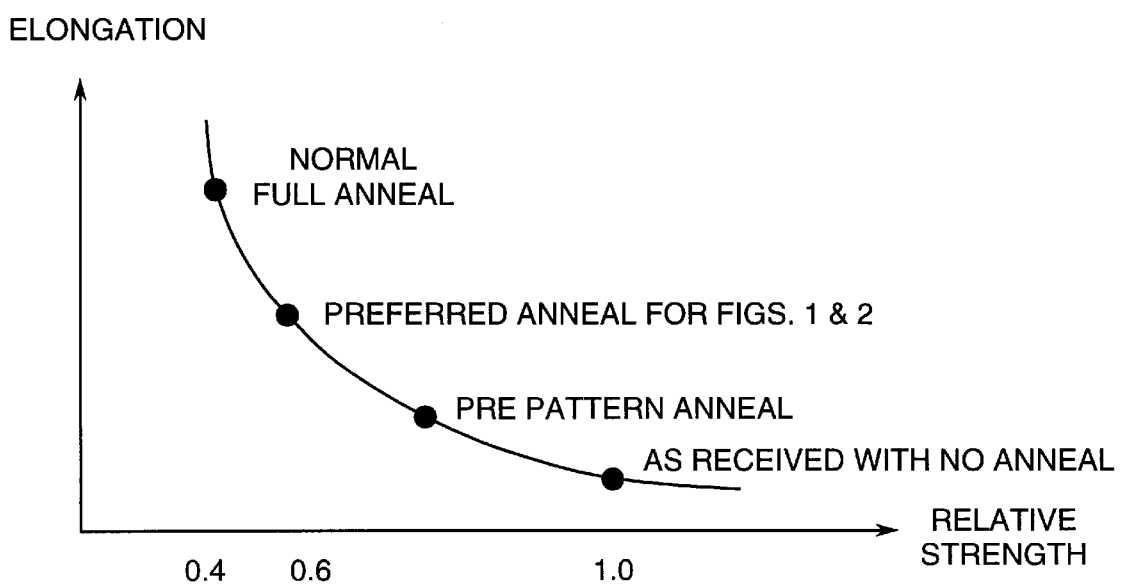
FIG. 3 is a graph representing elongation versus relative strength.

FIG. 3 is a graph representing elongation versus relative strength. In one embodiment of the present invention, annealing is performed at lower temperatures than conventional anneals so that the ductility is not as high as for normally annealed silicon steel but the relative strength remains high enough that the rotor laminations have sufficient strength to remain self supporting against high speed centrifugal forces.

In one embodiment the patterned sheet of silicon steel is annealed at a temperature ranging from about 675° C. (1250° F.) to about 732° C. (1350° F.) for a time period ranging from about 4 minutes to about 10 minutes. In this embodiment, the ductility is increased to provide about a 10% elongation before fracture and such that the tensile strength, although reduced from maximum tensile strength, is sufficient to withstand centrifugal forces of the rotor at high speeds. In a preferred embodiment, the temperature ranges from about 690° C. to about 710° C. for a time period ranging from about 6 minutes to about 9 minutes. Under the conditions of this preferred embodiment, the ductility of the material is increased such that there will be about a twenty percent (20%) elongation before fracture.

Referring back to FIGS. 1 and 2, lamination stack 14 can be pre-stressed to prevent loosening at high speeds when laminations 13 stretch in the radial direction due to centrifugal forces while shrinking in the axial direction consistent with Poisson's ratio for the material. Stressing of the laminations is typically accomplished by applying through bolts in the rotor core. In some embodiments, it would be useful to keep the lowest first bending critical speed substantially higher (by at least about ten percent) than the maximum operating speed. One way to accomplish this would be to use a large diameter shaft, but such a shaft would not leave enough room in the rotor core for rotor bolts.

In one embodiment of the present invention, pre-stressing is achieved with the rotor bars and end rings by inserting the rotor bars into the rotor slots and attaching the rotor end rings to the rotor bars while assembly 11 is hot. When the assembly 11 of the rotor laminations, the rotor bars, and the rotor end rings is cooled, the shrinkage of the rotor bars (which have a higher coefficient of expansion than the rotor laminations) provides the pre-stressing.

To achieve low slip and low rotor losses for high rotor efficiency, the rotor bars and rotor end rings preferably comprise copper. To increase the stress capability of the rotor bars, it is useful to disperse an oxide in the copper such as aluminum oxide or zirconium oxide. Such oxide dispersants can double the stress capability of normal copper with a minimal penalty (about 10%) in electrical conductivity and with low creep. Preferably the oxide is dispersed in both the rotor bars and the rotor end rings. One commercial brand of copper having an aluminum oxide dispersant is GLIDCOP™ dispersion strengthened copper (GLIDCOP is a trademark of OMG America for material available from OMG's SCM Metals business).

Selection of rotor dimensions affects the flux density and losses of the rotor. In one embodiment, the length of the rotor bars ranges from about 5 centimeters to about 13 centimeters, the diameter of the rotor shaft ranges from about 3.5 centimeters to about 6.5 centimeters, and the length of each rotor end ring ranges from about 0.25 centimeters to about 1.5 centimeters. Particularly useful dimensions are an outside laminations/end ring diameters of about 5 centimeters (about 2 inches) and a rotor bar length of about 10 centimeters (about 4 inches) for keeping open circuit flux density low (about 0.7 Tesla) in teeth and yokes to maintain low core losses in the stator at high frequencies, to minimize stray load losses, and to minimize flux choke points in the rotor. In one embodiment, seventeen (17) rotor bars are used. In this motor size range, a useful range of the rotor bar diameter is from about 0.254 centimeters (0.1 inches) to about 0.635 centimeters (0.25 inches).

The fabrication process includes stacking the rotor laminations, inserting the rotor bars into the rotor bar slots of the laminations, installing the end rings, and clamping assembly 11 with a fixture (not shown) to hold the assembly together and remove axial clearances. In one embodiment the fixture evenly applies approximately 454 kilograms (1000 pounds) of force, for example. During stacking, the laminations are aligned so that smooth rotor bar slots are formed.

Figure 9:
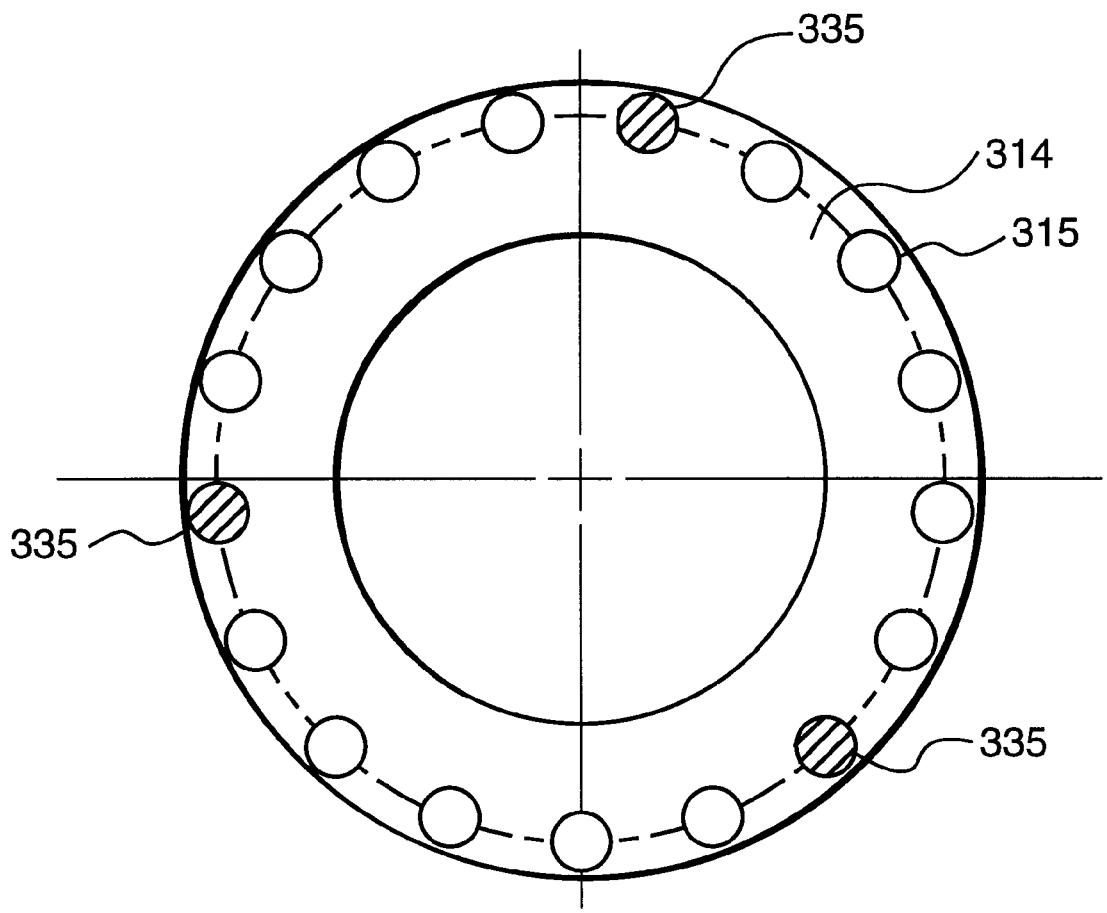
FIG. 9 is a view of alignment pins used in one embodiment for aligning rotor laminations during stacking.

FIG. 9 is a view of optional alignment pins 335 used in one embodiment for aligning rotor laminations 314 during stacking. Copper rotor bars, with or without oxide dispersants, are generally too soft to be used for alignment purposes and tend to snag on sharp edges of the laminations when attempts are made to use them to align the laminations. The alignment pins of the embodiment of FIG. 9 comprise a material with sufficient hardness to prevent the pins from damaging the laminations. One such material, for example, is steel. Although a single alignment pin can be used, in a preferred embodiment, at least three alignment pins are used. If multiple alignment pins are used, it is useful to have them spaced substantially equidistant from each other as shown in FIG. 9.

After the rotor laminations have been aligned, the alignment pins are preferably removed at the same time the rotor bars are inserted into the slots of the alignment pins. The slots 315 in which no alignment pins were present, can have their rotor bars inserted either before the alignment pins are removed, during the removal of alignment pins/insertion of rotor bars into former alignment slots, or after removal of the alignment pins.

Preferably, the laminations remain aligned during rotor bar installation and brazing, and the compressive forces on the laminations and end rings are evenly distributed.

If localized heat will be used for brazing, prior to brazing the rotor end rings to the rotor bars, the assembly is preheated. Preferably, the assembly is preheated to a temperature ranging from about 260° C. (500° F.) to about 371° C. (700° F.) with a particularly useful range of about 288° C. (550° F.) to about 316° C. (600° F.).

Figure 4:
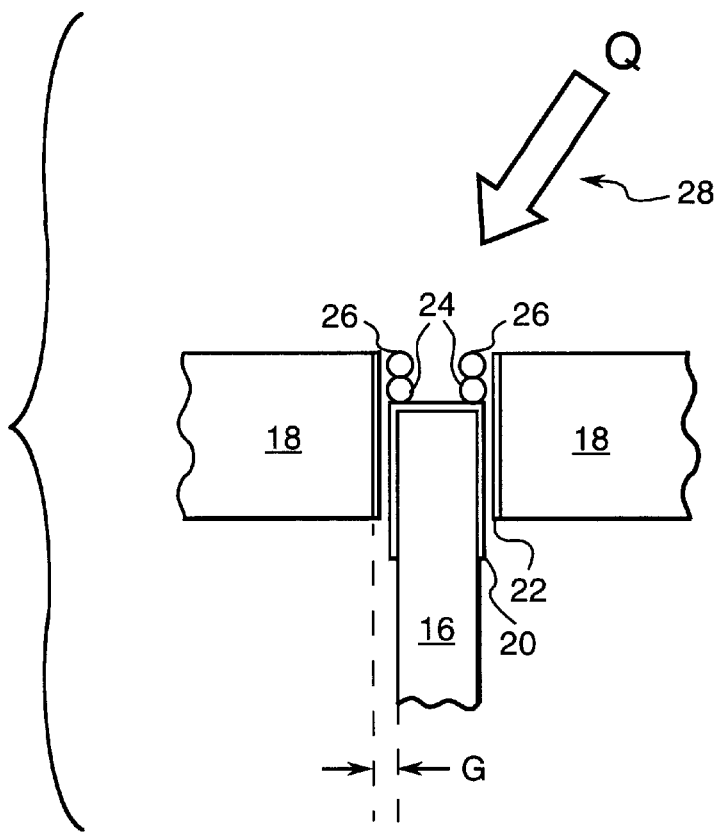
FIGS. 4 and 5 are sectional views illustrating different brazing embodiments of the present invention.
Figure 5:
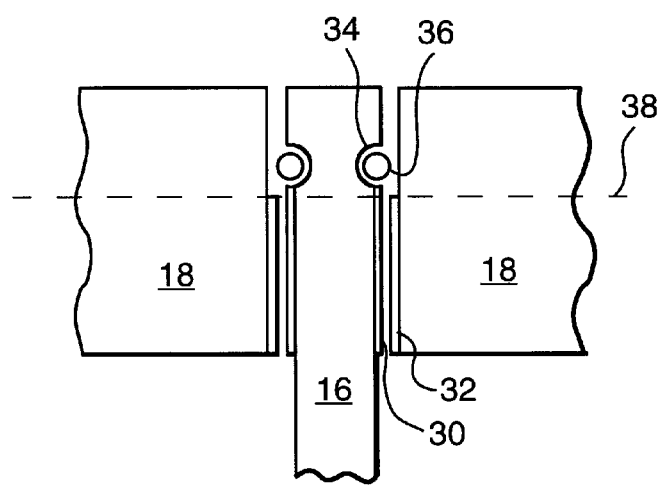

FIGS. 4 and 5 are sectional views illustrating different brazing embodiments of the present invention. If an oxide is dispersed in copper, conventional brazing temperatures, in the 1000° C. range for example, would overheat and reduce the strength of the rotor laminations. In an embodiment of the present invention, low temperature braze materials and careful selections of brazing temperatures and times can be used to provide a uniform braze that yields high axial strength without excessive cost and without significant negative effects on the rotor lamination heat treatment or the strength of the rotor end rings.

One example of a low temperature braze material is a low temperature silver based braze alloy such as American Welding Society (AWS) Specification BAg-1 (silver 44–46, copper 14–16, zinc 14–18, cadmium 23–25) with a brazing temperature range of 618° C. to 760° C. In a preferred embodiment, the brazing temperature is maintained at or below about 725° C. Silver based braze materials are useful because of their low melting temperatures. Their use with end rings and rotor bars comprising copper with an oxide dispersant requires careful control of the heating temperature and time because silver is soluble in copper. For example, the solubility is approximately 5 weight percent at 725° C. at equilibrium (which generally occurs after about one-half hour to one hour at this temperature). If the silver were to migrate through the oxide dispersant grain boundaries, the rotor bars and end rings would become brittle. In the preferred embodiment, commonly-used nickel plating is not required on the rotor bars or end rings to minimize migration, and a lower cost is achieved without sacrificing the quality of the braze by minimizing both time and temperature.

Another consideration is the proper clearance gap G (shown in FIG. 4) between each rotor bar 16 and rotor end ring 18. Through experiments, it has been found that the preferred range of the clearance gap is from about 0.00254 centimeters (0.001 inches) to about 0.00508 centimeters (0.002 inches). The difference between the diameter of the end ring opening 9 (FIG. 1) and the diameter of the rotor bar 16 thus preferably ranges from about 0.00508 centimeters (0.002 inches) to about 0.01016 centimeters (0.004 inches). The rotor bar is covered with flux 20 (FIG. 4) or 30 (FIG. 5) and the end ring is covered with flux 22 (FIG. 4) or 32 (FIG. 5) in the areas to be brazed. In one embodiment the flux comprises a fluoride-based flux such as AWS Specification FB3A.

In FIG. 4, the rotor bar does not extend to the outer end of the rotor end ring thus leaving room for insertion of braze material shown as rings 24 and 26. In the embodiment of FIG. 4, two rings of braze material having diameters of about 0.079375 centimeters (1/32 of an inch) are illustrated. The braze material can be melted with heat source 28. Heat source 28 may comprise any appropriate heat source. When the braze material is melted, the braze material moves into the flux covered areas between the rotor bars and the rotor end rings by capillary action. In one embodiment, the heat source is applied for a time period ranging from about 2 minutes to about 6 minutes.

In one embodiment, the heat source comprises a torch which heats the braze material until it melts. Typically a torch is used to heat each braze joint consecutively. When a torch is used, even though the heating is localized, heat still penetrates into the assembly, and the preheating of the assembly does not need to continue during brazing.

In another embodiment, the heat source comprises an electromagnetic point heater such as an induction heater that simultaneously heats all the braze joints of an end ring. The heat from an electromagnetic point heater is extremely localized in the area of the end ring, so continuation of the preheating during the brazing is recommended.

When a heat source is used for brazing with a low temperature braze material, no significant reduction in rotor lamination strength occurs (that is, any reduction is less than or equal to about 1%). In most circumstances, the present invention will not result in any strength degradation.

In FIG. 5, instead of using a heat source directed specifically at the blaze area, the entire assembly 11 of end rings 18, rotor bars 16, and rotor laminations (not shown in FIG. 5) is heated. The heat source in this embodiment may comprise a furnace, for example. For this embodiment, preheating is not required. The embodiment of FIG. 5 further illustrates the insertion of braze material 36 in notches 34 of rotor bar 16.

If the laminations are annealed prior to brazing, it is important that the brazing temperature be only as high as is needed to melt the braze materials and that the duration of brazing be long enough to form a uniform joint but short enough that the combination of temperature and time does not significantly impair the strength of the laminations. In one embodiment, the brazing occurs for a time period ranging from about 2 minutes to about 6 minutes.

If the laminations are not annealed prior to brazing, the brazing temperature and time should be selected to simultaneously perform the anneal and the braze operations. In one embodiment, for example, the temperature ranges from about 675° C. (1250° F.) to about 732° C. (1350° F.) and the minutes to about ten minutes. In this event, the laminations would not require annealing prior to being stacked. As discussed with respect to FIG. 3, the heating would reduce the strength of the laminations in an acceptable manner and the ductility of the laminations would be increased.

If the embodiment of FIG. 5 is used, after brazing and a cool down period, the end rings and rotor bars can be machined to line 38 to remove the notched portions of the rotor bars.

In both the embodiments of FIGS. 4 and 5, the use of consistent clearance gaps, flux applications, and volumes of braze material provides a uniform braze joint with minimal voids which is important to avoid stress risers due to centrifugal forces.

After the brazing, the rotor end rings, the laminations, and the rotor bars are permitted to cool so that the rotor bars and rotor end rings pre-stress the rotor laminations. In one embodiment, for example, about $1.03 \times 10^8$ PASCALs (15,000 pounds per square inch) result from bar shrinkage.

To prepare for attachment to the rotor shaft, the internal diameter of rotor assembly 11 is machined (preferably by grinding) to the proper interference fit as a unit. The unit is then attached to the rotor shaft by shrink fitting the assembly. In one embodiment, the rotor laminations, bars, and end rings are heated to a sufficient temperature, such as about 316° C. (600° F.), for example, so that the assembly has expanded to provide enough clearance between the assembly and the rotor shaft. The assembly is then positioned on a cool shaft and permitted to cool as a unit to room temperature.

The interference fit between the rotor shaft and the rotor assembly (the laminations and the end rings) is sufficiently tight to prevent separation at the maximum operating speed and temperature of the rotor. At the same time, the interference fit is not so tight as to produce excessively high tensile stresses in the core (specifically at the inside diameter of the laminations and/or at the portions of the laminations between the rotor bars and the outside surfaces of the laminations). To satisfy these interference fit requirements, it has been found that an interference fit ranging from about 0.0056 centimeters (0.0022 inches) to about 0.0069 centimeters (0.0027) inches is desirable.

During operation, rotor cooling is important for high speed induction motors. The end rings can be designed to assist in rotor loss heat transfer. In a preferred embodiment of the present invention, the end rings extend to the rotor shaft and are included in the shrink fit. This is useful because the end rings then are mounted and fixed in position and thus firmly position the bars. Additionally, the end rings provide a direct, low thermal resistance path to cool the rotor shaft from heat which results from rotor slip losses in the bars and end rings and stray load losses in the bars and laminations as well as inverter chopping losses.

The cooled assembly is then finish machined and balanced. The end rings and laminations on the resulting rotor are self-supporting against centrifugal forces at high speeds up to about sixty thousand rpm. Using the above-described process for careful selection of rotor assembly materials, processing conditions, and tolerances, material and production costs are minimized and efficiency is maximized. No retainer is required to stabilize and hold the rotor together against centrifugal forces and effects. This fabrication method is useful for delivering a high speed motor with efficiency only slightly less than a permanent magnet motor at considerably lower costs and can be built in existing production facilities with minimal investments in new equipment.

Figure 6:
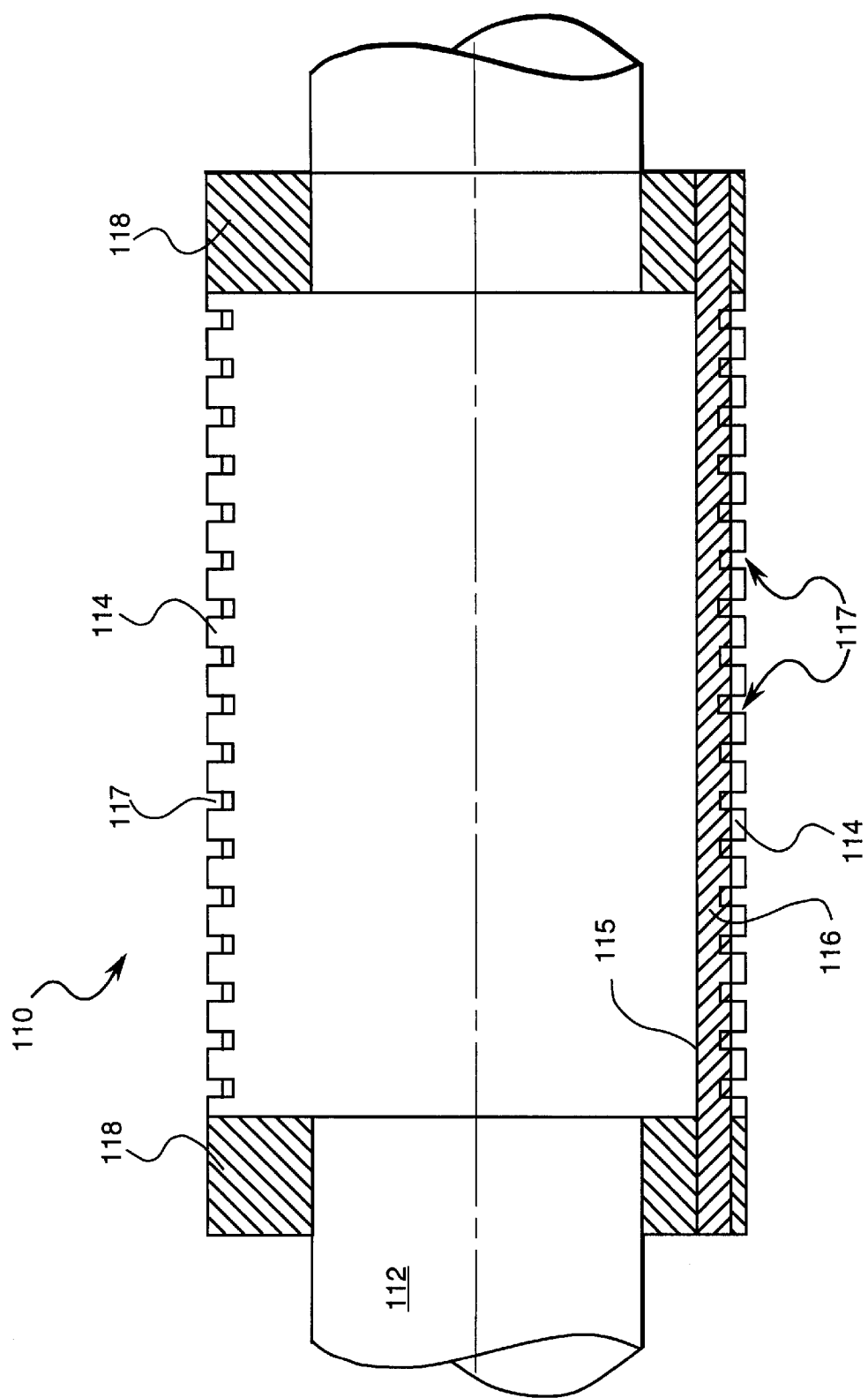
FIG. 6 is a sectional side view of another rotor of the present invention.

FIG. 6 is a sectional side view of another rotor 110 of the present invention wherein a solid rotor core is used instead of a laminated rotor core. In this embodiment the induction motor rotor includes a rotor shaft 112, a solid rotor core 114 integral to the shaft and having rotor grooves 117 and rotor bar slots 115, a plurality of rotor bars 116 extending through the rotor bar slots, and two rotor end rings 118 brazed to the rotor bars and extending to the rotor shaft. As with the description of FIGS. 1 and 2, the rotor bars and rotor end rings pre-stress the core to prevent loosening during rotation of the rotor. The only difference is that less pressure is needed to pre-stress a solid core than to pre-stress a laminated core.

In one embodiment, the rotor grooves have a depth ranging from about two millimeters to about three millimeters and a narrow width ranging from about 0.025 millimeters to about 0.050 millimeters and are closely spaced with a distance of about 1 mm between each groove. In a preferred embodiment, the shape of each groove is approximately rectangular.

Figure 7:
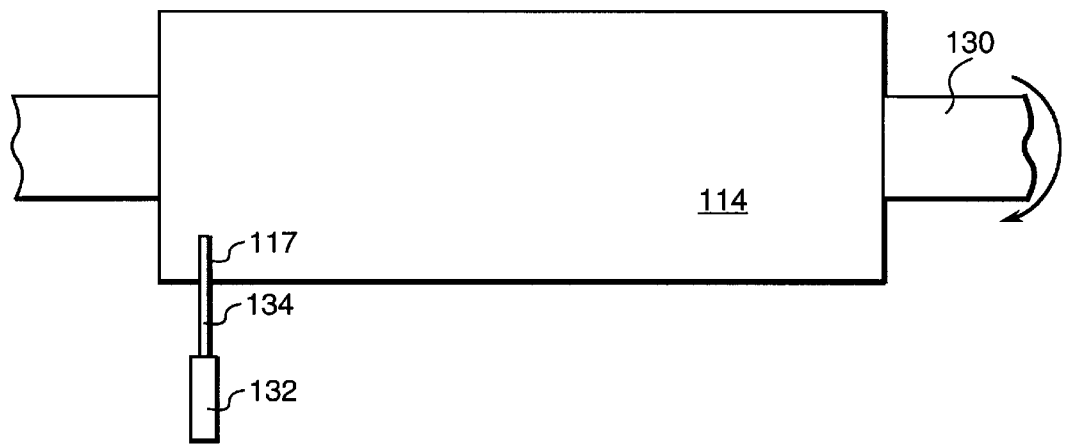
FIG. 7 is a side view of a fabrication embodiment for the rotor core of the rotor of FIG. 6.

FIG. 7 is a side view of a fabrication embodiment for the rotor core of the rotor of FIG. 6. In this embodiment rotor core 114 is turned on a lathe 130 while an energy source 132 cuts thin rotor grooves with energy beam 134. The energy source may comprises a laser or an electron beam generator, for example. After a groove is formed, the laser or the core can be stepped sideways and the adjacent groove can be cut.

Rotor bar slots 15 can be fabricated either before or after grooves 117 are cut. If the grooves extend into the rotor bar slot areas as shown in FIG. 6, then the rotor bars are inserted after the cutting of the grooves. If the grooves do not extend into the rotor bar slots, then the rotor bars can be inserted either before or after groove cutting.

Figure 8:
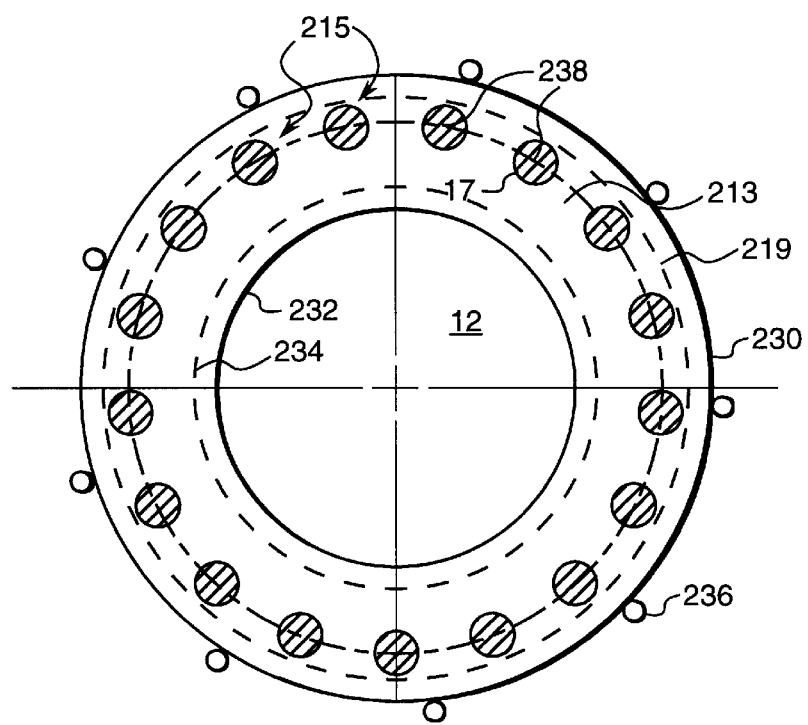
FIG. 8 is a view of a lamination stack of the present invention.

FIG. 8 is a view of a lamination stack of the present invention. In this embodiment, the patterned laminations 213 are stacked with the rotor slots aligned by alignment bars 238 and then laser welds 236 are formed on the outer circumference 230 of the stack. In one embodiment the alignment bars comprise steel. When the alignment bars are removed from the laminations, the alignment is maintained. Copper rotor bars (not shown in FIG. 8) can be inserted and brazed to copper end rings (not shown in FIG. 8) as discussed above.

After brazing, the outer circumference 230 of the laminations can be machined to circumference 219 to remove laser welds 236 and create appropriate clearance between the rotor and the stator (not shown) with which it will be used. Additionally, the original shaft hole 232 is machined (preferably by grinding) to form an enlarged shaft hole 234 for insertion and shrink fitting over the rotor shaft. This technique is particularly useful if the fabrication and stacking of laminations occurs at a different location than the brazing of the rotor bars and end rings.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for fabricating an induction motor rotor lamination, the method comprising:

patterning a sheet of silicon steel comprising a percentage of silicon ranging from about 2.35 to about 4.5 to form a rotor lamination having rotor bar slots; and annealing the rotor lamination at a temperature ranging from about 675° C. to about 732° C. for a time period ranging from about 4 minutes to about 10 minutes.

2. The method of claim 1 wherein annealing the rotor lamination is performed so as to provide the rotor lamination an elongation of a ten percent.

3. A method for fabricating an induction motor rotor lamination, the method comprising:

patterning a sheet of silicon steel comprising a percentage of silicon ranging from about 3 to about 3.5 to form a rotor lamination having rotor bar slots; and annealing the rotor lamination at a temperature ranging from about 690° C. to about 710° C. for a time period ranging from about six minutes to about nine minutes.

* * * * *

UNITED STATES PATENT AND TRADEMARK OFFICE
CERTIFICATE OF CORRECTION

PATENT NO. : 6,159,305            Page 1 of 1
DATED : December 12, 2000
INVENTOR(S) : Gerald Burt Kliman, Raymond Alan White, Wen Liang soong, Roger Neal Johnson, Joseph Eugune Miller & John Raymond Hughes It is certified that error appears in the above-identified patent and that said Letters Patent is hereby corrected as shown below:

<u>Column 8, claim 2,</u>
Line 29, is printed as "an elongation of a ten percent" should be corrected to -- an elongation of at least ten percent --

Signed and Sealed this

Fifth Day of February, 2002

JAMES E. ROGAN
*Director of the United States Patent and Trademark Office*

*Attest:*

*Attesting Officer*